United States Patent [19]
Dohi et al.

[11] Patent Number: 5,594,754
[45] Date of Patent: Jan. 14, 1997

[54] SPREAD SPECTRUM COMMUNICATION RECEIVER

[75] Inventors: Tomohiro Dohi, Yokohama; Mamoru Sawahashi, Yokosuka; Fumiyuki Adachi, Yokohama, all of Japan

[73] Assignee: NTT Mobile Communications Network Inc., Tokyo, Japan

[21] Appl. No.: 448,396
[22] PCT Filed: Oct. 12, 1994
[86] PCT No.: PCT/JP94/01701
  § 371 Date: Jun. 6, 1995
  § 102(e) Date: Jun. 6, 1995
[87] PCT Pub. No.: WO95/10891
  PCT Pub. Date: Apr. 20, 1995

[30] Foreign Application Priority Data

Oct. 13, 1993 [JP] Japan ................ 5-255633

[51] Int. Cl.⁶ ............ H04B 15/00; H04K 1/00; H04L 27/30
[52] U.S. Cl. ............ 375/200; 375/206; 375/344
[58] Field of Search ............ 375/200, 206, 375/205, 344; 455/255, 260

[56] References Cited

U.S. PATENT DOCUMENTS 5,150,377  9/1992  Vannucci .................. 375/206
5,329,546  7/1994  Lee ........................ 375/206
5,467,367  11/1995  Izumi et al. ............. 375/206

FOREIGN PATENT DOCUMENTS 2-165746  6/1990  Japan.
6-21915   1/1994  Japan.

*Primary Examiner*—Stephen Chin
*Assistant Examiner*—Hai H. Phan
*Attorney, Agent, or Firm*—Rogers & Wells

[57] ABSTRACT

A spread spectrum communication receiver which can obviate a highly accurate, highly stable VCO used in a local signal oscillator. The receiver includes a corrector for correcting by a correcting signal a baseband signal obtained by spectrum despreading; a RAKE circuit for recovering information by demodulating corrected baseband signal; a remodulator for remodulating the demodulated signal outputted from the RAKE circuit, thereby generating a signal corresponding to a primary modulated signal at a transmitter; a multiplier for multiplying the baseband signal by the complex conjugate of the output of the remodulator; an averaging circuit for averaging the output of the multiplier to eliminate noise components of the baseband signal, thereby outputting only frequency offset component of the received signal and the local signal; and a circuit for producing a correcting signal with an angular velocity obtained from said frequency offset component and a polarity opposite to that of the baseband signal, thereby eliminating the frequency offset component by the corrector.

4 Claims, 3 Drawing Sheets

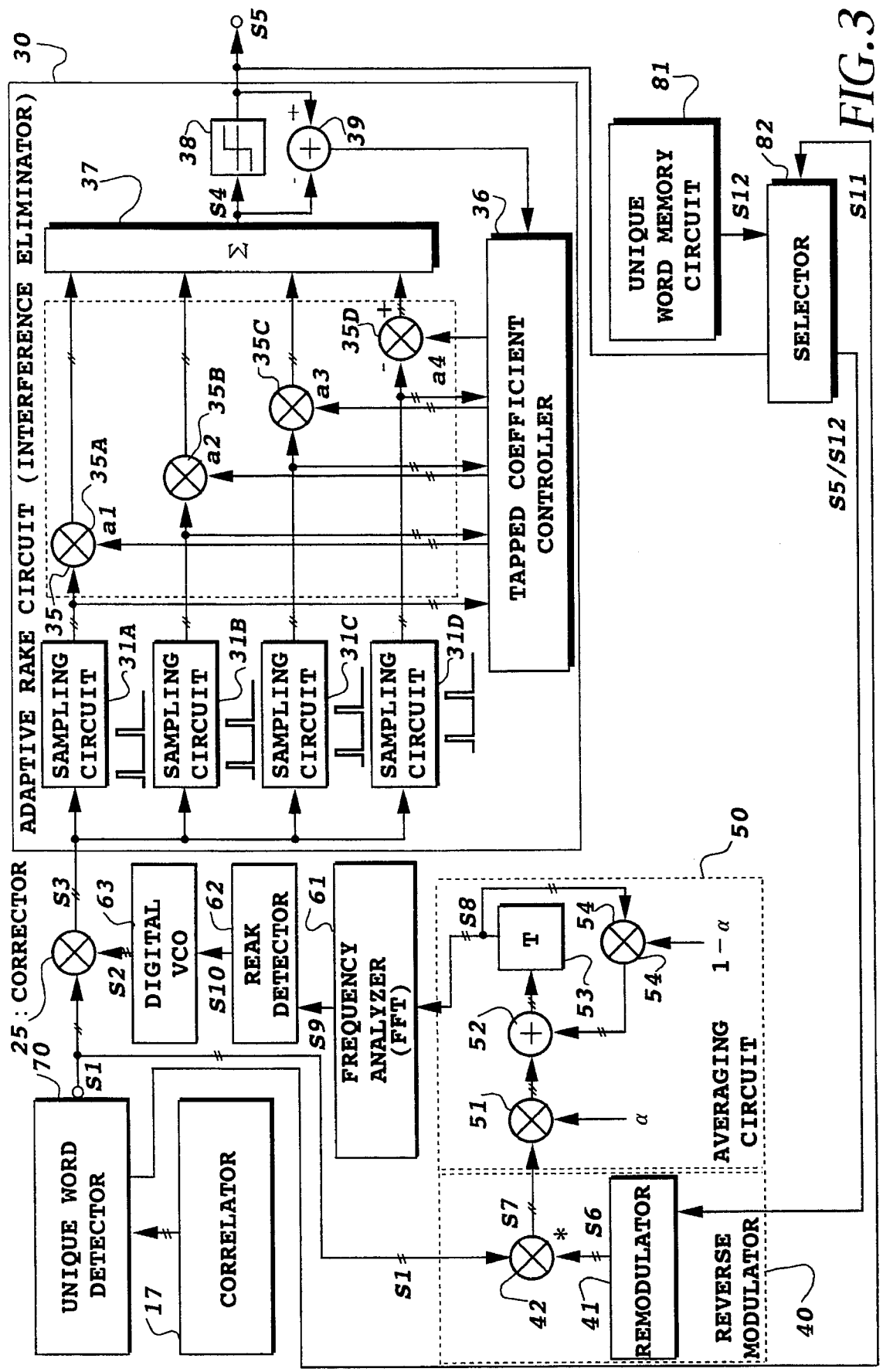

16
SPREAD SPECTRUM COMMUNICATION RECEIVER

TECHNICAL FIELD

The present invention relates to a receiver of a code division multiple access (CDMA) communication system appropriate for mobile communications, and particularly to a spread spectrum communication receiver which corrects a frequency offset of a local signal with respect to a received signal in a baseband signal region.

The term "baseband signal" in this specification refers to a signal having no carrier signal components. More specifically, the baseband signal at a transmitter refers to a signal after the primary modulation or a signal after spreading, and the baseband signal at a receiver refers to a signal after quadrature detection and before despreading, and a signal after despreading.

BACKGROUND ART

Recently, tremendous research and development effort has been directed to CDMA systems. The CDMA system falls into a direct sequence (DC) system and a frequency hopping (FH) system. The FH system is seldom used at present. This is because the FH system resolves a symbol into elements called chips, and translates individual chips into carriers of different frequencies at a high rate, which is difficult to be implemented by a frequency synthesizer in the state of the art.

Thus, the DS system is commonly used. The DS system performs, at a transmitter, a primary modulation of an original signal use in QPSK or the like, spreading (secondary modulation) of the primary modulated signal into a wideband signal using a spreading code, and transmission thereof on a carrier, and at a receiver, removal of the carrier, despreading (secondary demodulation) of the wideband signal into the primary modulated signal using the spreading code identical to that of the transmitter, and recovery of the original signal by a primary demodulation.

Problems involved in applying the CDMA system to mobile communication systems such as portable telephony will be considered. Base station equipment of mobile communications today includes a highly stable reference oscillator, and the accuracy under the domestic standard for digital vehicle telephony in Japan is less than 0.05 ppm in absolute accuracy. On the other hand, mobile station equipment usually employs a temperature compensated crystal oscillator (TCXO) because of difficulty of using a highly stable reference oscillator with a thermostat. The frequency accuracy of the crystal oscillators is approximately 3 ppm in absolute accuracy in an 800 MHz band.

As a result, the frequency of the local signal of a mobile station will deviate from the center frequency of a transmitted signal of a base station (that is, a received signal of the mobile station). To compensate for the offset of the frequency to maintain stable receiving operation, an AFC (Automatic Frequency Control) circuit is required. In addition, since a mobile station is usually moving with respect to the base station, the center frequency of the received signal further deviates by an amount corresponding to the Doppler frequency.

FIG. 1 shows a major portion of a conventional CDMA receiver with an AFC circuit. An intermediate frequency (IF) received signal applied to an input terminal 10 is divided into two parts by a hybrid coil 10A, and is supplied to a quadrature detector 11. The quadrature detector 11 detects the IF received signal by a local signal from a voltage controlled oscillator (VCO) 12, and outputs an in-phase baseband signal I and a quadrature baseband signal Q. These baseband signals are baseband signals spread by a spreading code. The I baseband signal is supplied to an A/D converter 15 through an LPF (lowpass filter) 13, and is converted into a digital signal. Likewise, the Q baseband signal is supplied to an A/D converter 16 through an LPF 14, and is converted into a digital signal.

These digital signals are fed to a correlator 17 consisting of matched filters or a sliding correlator, which detects correlation between the received digital signals and the spreading code, thereby despreading the digital signals. In other words, the correlator 17 functions as a despreader, and outputs baseband signals corresponding to the primary modulated signal. The outputs of the correlator 17 are supplied to a RAKE receiver and demodulator 18 which demodulates the baseband signals corresponding to the primary modulated signal and recovers the original signal.

An AFC circuit 20 is arranged as follows: The outputs of the correlator 17 are supplied to a differential demodulator 21. Signals undergone the differential demodulation are supplied to a phase error detector 22. The phase error detector 22 obtains a phase error component $\tan^{-1}(Q/I)$ from the amplitudes of the I and Q signals, and outputs it. This output signal represents a phase rotation component, that is, a phase error at the receiver with respect to a mapped point of the primary modulated signal at the transmitter. In other words, a phase error signal is obtained which is proportional to a frequency error between the received signal and the local signal. The phase error signal is averaged by a loop filter 23, and fed back to the VCO 12 as a control voltage. Thus, the VCO 12 undergoes feedback control by the error correcting voltage corresponding to the phase error signal, so that the frequency error between the center frequency of the received signal and the frequency of the local signal is corrected.

According to this method, a problem arises in that the mobile unit becomes expensive because a highly accurate, highly stable VCO is required as the VCO 12.

DISCLOSURE OF THE INVENTION

Therefore, an object of the present invention is to provide a spread spectrum communication receiver which is appropriate to be embedded into an IC, and is inexpensive.

In a first aspect of the present invention, there is provided a spread spectrum communication receiver comprising:

a detector for detecting a received signal using a local signal, thereby converting the received signal into a first baseband signal;

a despreader for despreading the first baseband signal using a spreading code, thereby outputting a second baseband signal corresponding to a primary modulated signal at a transmitter;

a corrector for correcting the second baseband signal by a correcting signal;

an interference eliminator for suppressing an interference component in a third baseband signal outputted from the corrector, thereby generating a desired signal component;

a remodulator for modulating the desired signal component, thereby generating a remodulated signal corresponding to the primary modulated signal at the transmitter;

a multiplier for multiplying the second baseband signal by a complex conjugate signal of the remodulated signal, thereby outputting a signal including a frequency offset component representing an offset frequency corresponding to a deviation of the frequency of the local signal with respect to the center frequency of the received signal;

an averaging circuit for averaging an output of the multiplier to eliminated noise components of the output of the multiplier, thereby outputting the frequency offset component; and a correcting signal generator for generating the correcting signal by extracting the offset frequency from the frequency offset component.

The correcting signal generator may comprise a fast Fourier transform circuit for Fourier transforming the frequency offset component, a peak detector for detecting a peak of an output of the fast Fourier transform circuit, and a digital voltage controlled oscillator for generating the correcting signal by oscillating at a frequency corresponding to the peak.

The interference eliminator may comprise an adaptive RAKE circuit.

The spread spectrum communication receiver may further comprise:

a memory circuit for storing a pattern of a known unique word;

a detector for detecting a start of receiving the unique word from the second baseband signal; and a selector for selectively providing the remodulator with the unique word from the memory circuit when the detector detects the start of receiving the unique word, and with an output of the interference eliminator when the detector detects an end of receiving the unique word.

According to the present invention, an offset between the center frequency of the received signal and the frequency of the local signal is corrected by a digital signal processing in a baseband signal domain. As a result, a highly accurate, highly stable oscillator, which is required in the conventional local signal oscillator to convert the received signal into the baseband signal, can be obviated. This makes it possible to reduce the cost of the mobile unit.

BRIEF DESCRIPTION OF THE DRAWINGS

FIG. 3 is a block diagram showing a second embodiment of a spread spectrum communication receiver in accordance with the present invention.

BEST MODE FOR CARRYING OUT THE INVENTION

Figure 1:
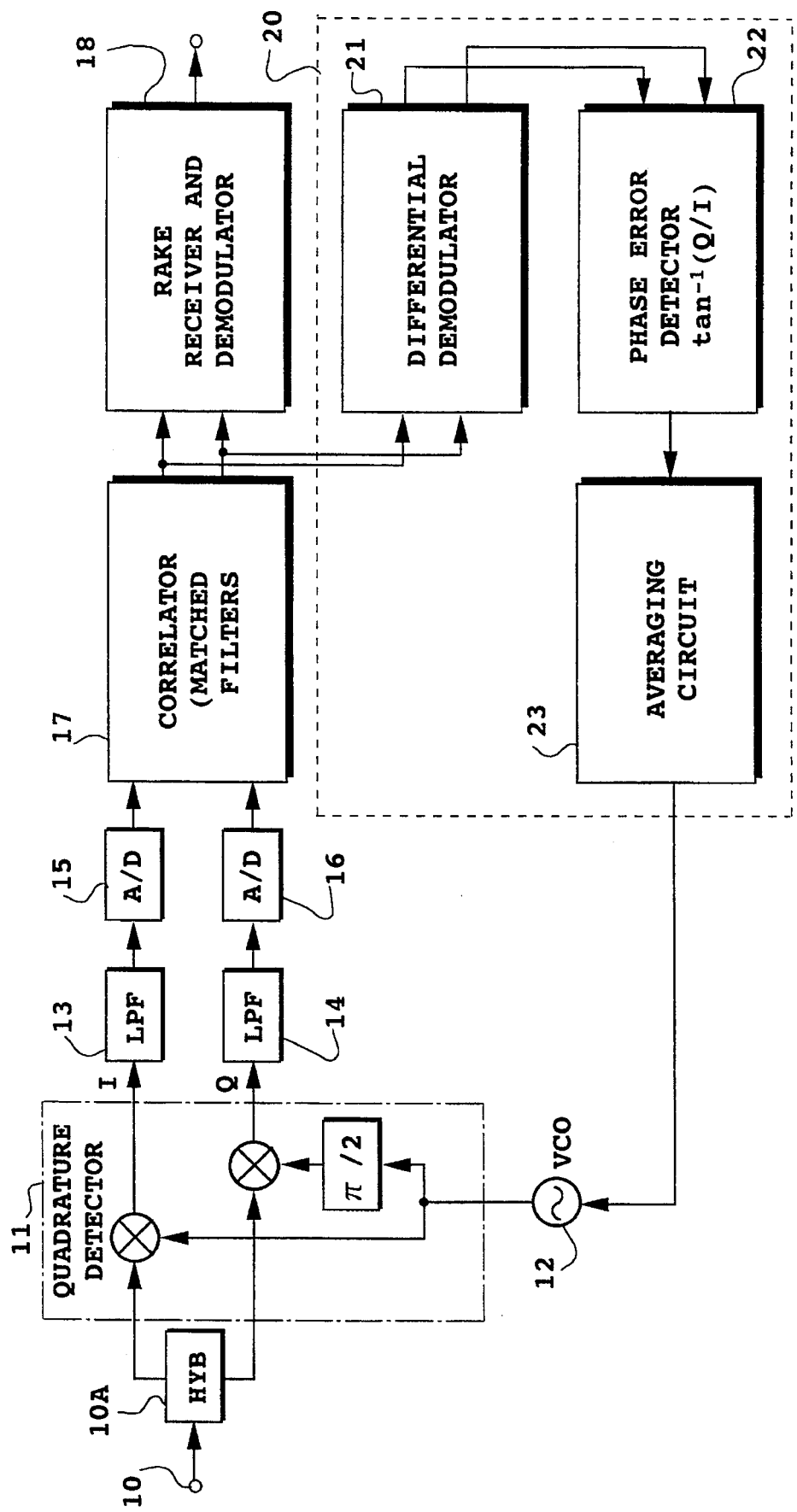
FIG. 1 is a block diagram showing a major portion of a conventional spread spectrum communication receiver.
Figure 2:
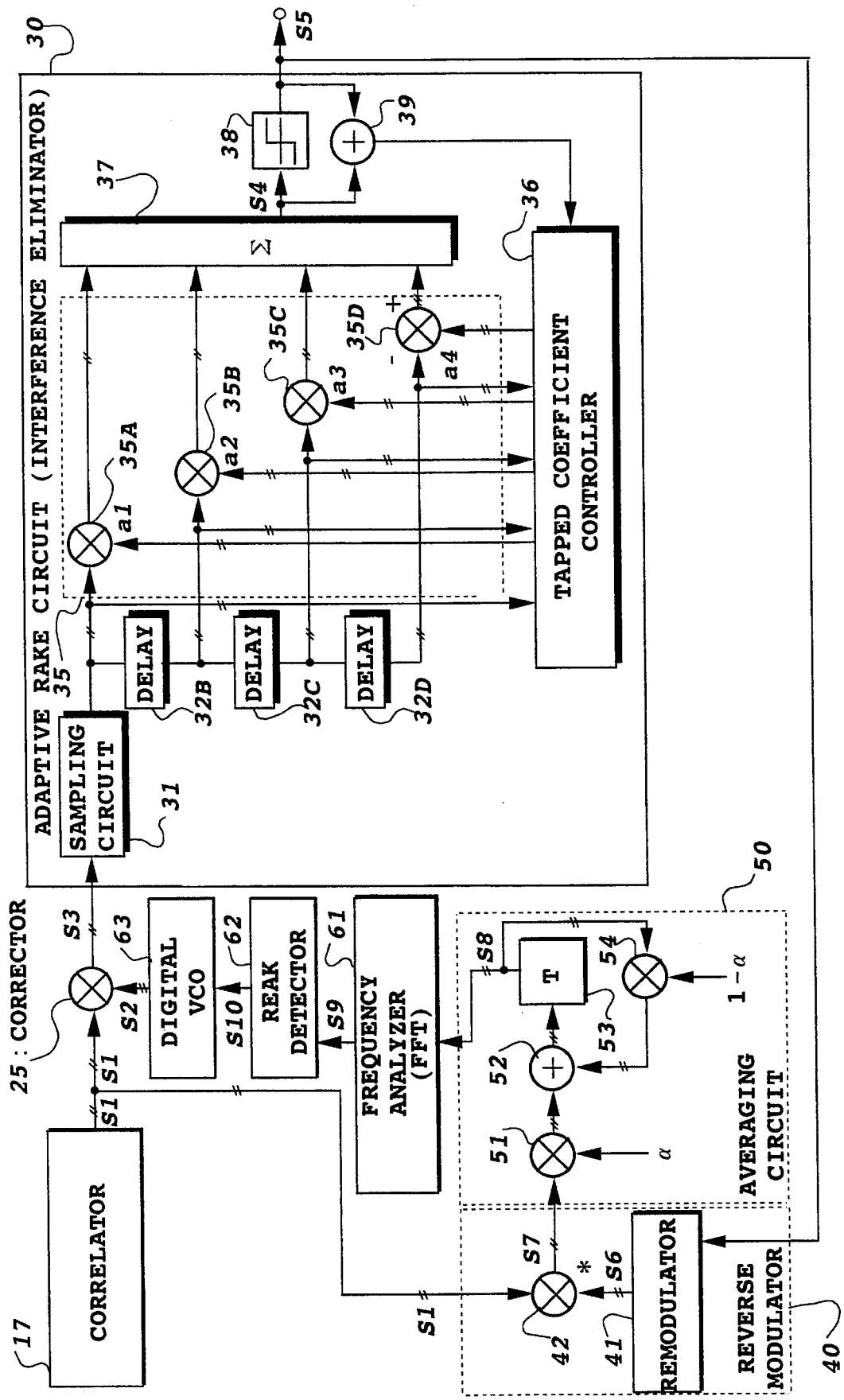
FIG. 2 is a block diagram showing a first embodiment of a spread spectrum communication receiver in accordance with the present invention.

Embodiments of the present invention will now be described with reference to the accompanying drawings. In FIGS. 2 and 3, a double slash mark (//) on lines indicates that the lines are a double line. Accordingly, signals on these lines can be handled as a complex number.

EMBODIMENT 1

FIG. 2 is a block diagram showing a first embodiment of a spread spectrum communication receiver in accordance with the present invention.

In FIG. 2, a baseband signal outputted from a correlator (despreader) 17, that is, the despread signal S1, which corresponds to the primary modulated signal, can be expressed as $S1(t)=R \cdot e^{j\Delta\omega t} \cdot e^{j\phi(t)}+N(t)$, where R is the amplitude of the baseband signal S1, $\Delta\omega$ is $2\pi\Delta f$, $\Delta f$ is a frequency offset between the received signal and a local signal, $\phi(t)$ is the phase of a modulated component of the baseband signal S1, and $N(t)$ is a random thermal noise component. The signal S1 is multiplied at a corrector 25 by a correcting signal S2 which will be described later, thereby being corrected. The corrected signal S3 is supplied to an adaptive RAKE circuit 30 functioning as an interference eliminator.

The adaptive RAKE circuit 30 includes a sampling circuit 31 that samples that signal S3; delay circuits 32B–32D that delay the output of the sampling circuit 31 by predetermined time periods; multipliers 35A–35D that multiply the output of the sampler 31 and the outputs of the delay circuits 32B–32D by tapped coefficients a1–a4, respectively; a tapped coefficient controller 36 that generates the tapped coefficients a1–a4 on the basis of the output of the sampling circuit 31, the outputs of the delay circuits 32B–32D, and the output of an adder 39 which will be described below; an integrator 37 that sums the outputs of the multipliers 35A–35D; a decision circuit 38 that decides a summed output S4, and produces the decided output (desired wave component) S5; and the adder 39 that outputs the difference between the output S5 of the decision circuit 38 and the output S4 of the integrator 37. The decided output (desired wave component) S5 is supplied to a reverse modulator 40 including a remodulator 41 and a multiplier 42. The remodulator 41A remodulates the decided output S5 in a manner similar to the primary modulation at the transmitter, thereby outputting a remodulated signal S6. The remodulated signal S6 can be expressed as $S6=e^{j\hat{\phi}(t)}$. The multiplier 42 multiplies the complex conjugate $e^{-j\hat{\phi}(t)}$ of the remodulated signal S6 by the input baseband signal S1, thereby outputting a signal S7. The signal S7 can be expressed as follows:

$$\begin{aligned} S7 &= (R \cdot e^{j\Delta\omega t} \cdot e^{j\phi(t)} + N(t)) \cdot e^{-j\hat{\phi}(t)} \\ &= R \cdot e^{j\Delta\omega t} \cdot e^{j(\phi(t)-\hat{\phi}(t))} + N(t) \cdot e^{-j\hat{\phi}(t)} \end{aligned}$$

where $\phi(t) \approx \hat{\phi}(t)$. Thus, the following expression is obtained.

$$S7 = R \cdot e^{j\Delta\omega t} + N(t) \cdot e^{-j\hat{\phi}(t)}$$

The first term of the right-hand side of the expression represents the frequency offset component, and the second term represents a thermal noise component. In other words, the reverse modulator 40 separates the baseband signal S1 into the frequency offset component and the thermal noise component.

The signal S7 outputted from the reverse modulator 40 is averaged by an averaging circuit 50 which eliminates the thermal noise component $N(t) \cdot e^{-j\hat{\phi}(t)}$, thereby producing only the frequency offset component $R \cdot e^{j\Delta\omega t}$. The averaging circuit 50 includes a multiplier 51, an adder 52, a delay circuit 53, and a multiplier 54. The multiplier 51 multiplies the signal S7 by a predetermined fixed value $\alpha$. The adder 52 adds the outputs of the multipliers 51 and 54. The delay circuit 53 delays the output of the adder 52 by a time period T. The multiplier 54 multiplies the output of the delay circuit 53 by a fixed value $(1-\alpha)$. Thus, the averaging circuit 50 averages the signal S7, and outputs a signal S8 that includes only the frequency offset component of the signal S7.

The signal S8 is supplied to a frequency analyzer 61. The frequency analyzer 61 is an FFT circuit that Fourier transforms the frequency offset component $R \cdot e^{j\Delta\omega t}$. Thus, the frequency analyzer 61 outputs a signal S9, in which a line spectrum stands at an angular frequency $\Delta\omega$. The signal S9 is fed to a peak detector 62. The peak detector 62 obtains an angular frequency $\Delta\omega$ corresponding to the peak, and supplied a frequency control signal S10 corresponding to the angular frequency to a digital VCO 63. Thus, the digital VCO 63 outputs the correcting signal S2 with the angular frequency $\Delta\omega$ and a phase opposite to that of the signal S1. The correcting signal S2 is supplied to the corrector 25, which multiplies the input baseband signal S1 by the correcting signal S2, thereby eliminating the frequency offset component of the signal S1.

EMBODIMENT 2

FIG. 3 is a block diagram showing the major portion of a second embodiment of a spread spectrum communication receiver in accordance with the present invention. The second embodiment differs from the first embodiment in the following:

(1) A unique word detector 70 for carrying out a frame synchronization is connected to the output of the correlation detector 17. The unique word detector 70 detects the start point of receiving a frame, that is, the start point of receiving a unique word used for frame synchronization, and outputs a switching signal S11. In addition, the unique word detector 70 detects the end of receiving the unique word.

(2) A unique word memory circuit 81 is provided for storing a known unique word transmitted for establishing synchronization. The unique word is generally sent at the initial portion of a frame followed by information transmission, and is used for frame synchronization.

(3) A selector 82 is provided for selecting and outputting either the decided output S5 or the unique word S12. This selection is controlled by the switching signal S11 from the unique word detector 70.

(4) Four sampling circuits 31A–31D are employed instead of the sampling circuit 31 and the delay circuits 32B–32D in FIG. 2. The sampling timings of the samplers 31A–31D are sequentially shifted as shown in FIG. 3. This makes it possible to achieve effect similar to that obtained by the combination of the sampling circuit 31 and the delay circuits 32B–32D. This section can have the same arrangement as that of FIG. 2.

The selector 82 provides the remodulator 41 with the unique word S12 read from the unique word memory circuit 81 while receiving a unique word, and with the output S5 of the decision circuit 38 while receiving information. Thus, a correct remodulated signal S6 can always be obtained while receiving a known unique word. As a result, the second embodiment can eliminate the frequency offset component at higher accuracy than the first embodiment.

What is claimed is:

1. A spread spectrum communication receiver comprising:

a detector for detecting a received signal using a local signal, thereby converting the received signal into a first baseband signal;

a despreader for despreading said first baseband signal using a spreading code, thereby outputting a second baseband signal corresponding to a primary modulated signal at a transmitter;

a corrector for correcting said second baseband signal by a correcting signal;

an interference eliminator for suppressing an interference component in a third baseband signal outputted from said corrector, thereby generating a desired signal component;

a remodulator for modulating said desired signal component, thereby generating a remodulated signal corresponding to the primary modulated signal at said transmitter;

a multiplier for multiplying said second baseband signal by a complex conjugate signal of said remodulated signal, thereby outputting a signal including a frequency offset component representing an offset frequency corresponding to a deviation of the frequency of said local signal with respect to the center frequency of said received signal;

an averaging circuit for averaging an output of said multiplier to eliminated noise components of the output of said multiplier, thereby outputting said frequency offset component; and a correcting signal generator for generating said correcting signal by extracting said offset frequency from said frequency offset component.

2. The spread spectrum communication receiver as claimed in claim 1, wherein said correcting signal generator comprises a fast Fourier transform circuit for Fourier transforming said frequency offset component, a peak detector for detecting a peak of an output of said fast Fourier transform circuit, and a digital voltage controlled oscillator for generating said correcting signal by oscillating at a frequency corresponding to the peak.

3. The spread spectrum communication receiver as claimed in claim 2, wherein said interference eliminator comprises an adaptive RAKE circuit.

4. The spread spectrum communication receiver as claimed in claim 1, further comprising:

a memory circuit for storing a pattern of a known unique word;

a detector for detecting a start of receiving said unique word from said second baseband signal; and a selector for selectively providing said remodulator with said unique word from said memory circuit when said detector detects the start of receiving said unique word, and with an output of said interference eliminator when said detector detects an end of receiving said unique word.

* * * * *

UNITED STATES PATENT AND TRADEMARK OFFICE
CERTIFICATE OF CORRECTION

PATENT NO.    : 5,594,754
DATED         : January 14, 1997
INVENTOR(S)   : Tomohiro Dohi, Mamoru Sawahashi and Fumiyuki Adachi It is certified that error appears in the above-identified patent and that said Letters Patent is hereby corrected as shown below:

<u>Title page,</u>
Item [73], Assignee, change "NIT" to -- NTT --

<u>Column 4,</u>
Line 31, start a new paragraph with "The"
Line 34, change "41A" to -- 41 --

Signed and Sealed this

Twentieth Day of May, 2003

JAMES E. ROGAN
*Director of the United States Patent and Trademark Office*